Jan. 3, 1939.   W. J. MORRISSEY   2,142,141
APPARATUS FOR SYNCHRONIZING PICTURES WITH SOUND
Filed Nov. 13, 1935   2 Sheets-Sheet 1
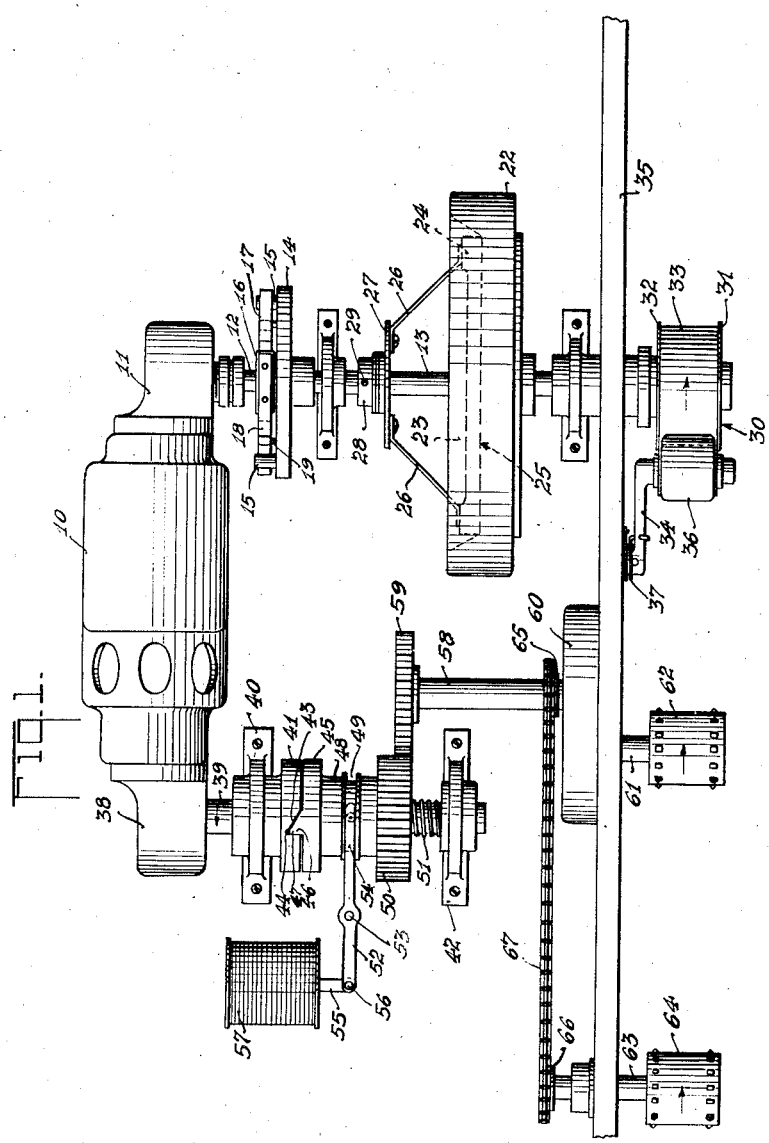
INVENTOR
WILLIAM J. MORRISSEY
BY Van Deventer & Grier
ATTORNEYS.

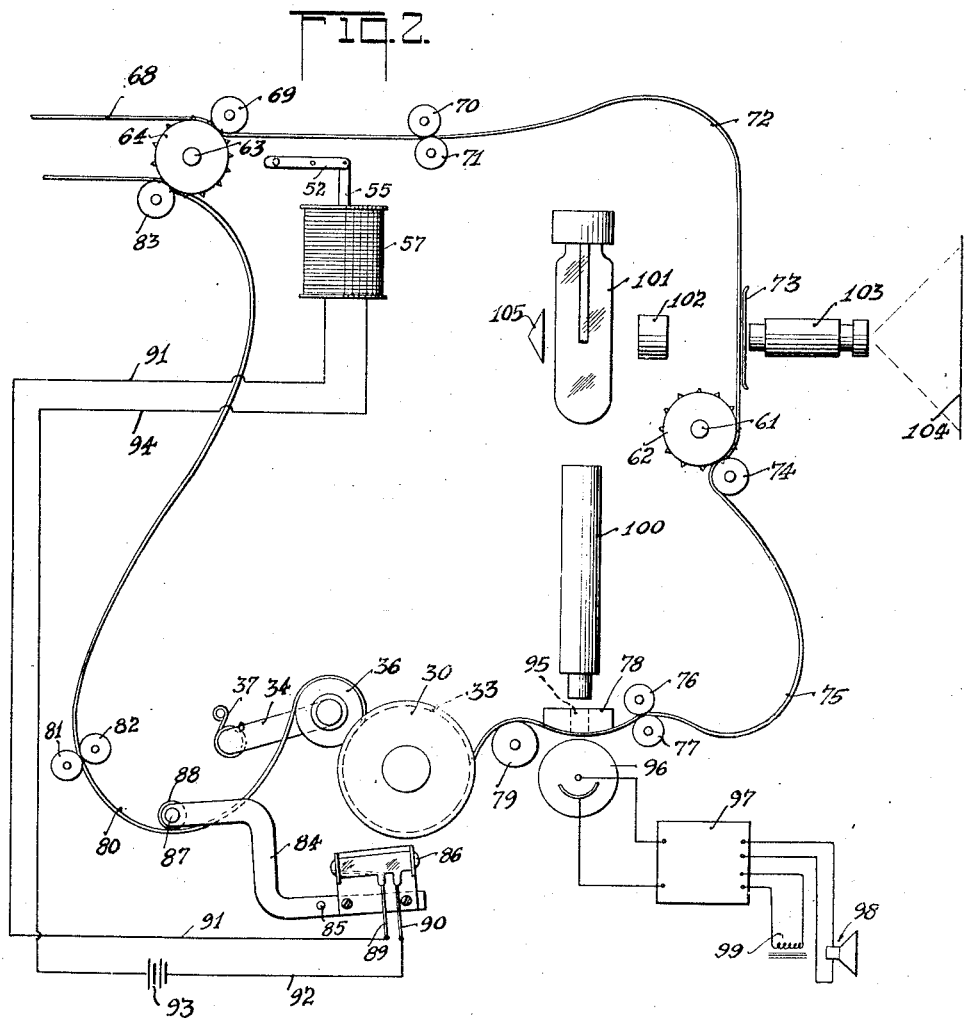

Patented Jan. 3, 1939

2,142,141

UNITED STATES PATENT OFFICE 2,142,141

APPARATUS FOR SYNCHRONIZING PICTURES WITH SOUND

William J. Morrissey, Brooklyn, N. Y.

Application November 13, 1935, Serial No. 49,447

6 Claims. (Cl. 88—16.2)

This invention relates to improvements in apparatus for synchronizing pictures with sound and has for a principal object the provision of a device for projecting pictures and producing sound, in which the record in the sound reproducing portion of the machine are driven at a constant speed on a drum, or the like, having a smooth surface, and in which the film through the picture projecting portion of the machine, and to and from the drum, is carried on sprockets or otherwise positively driven, said device being adapted to bring a picture into synchronism with the sound to correct for slippage of the record on the drum.

In sound reproducing devices in which the film is carried on a smooth drum, slippage occurs due to the fact that no teeth are driving the film and the purpose of the present invention is to drive the film through the sound portion of the machine at as nearly a constant speed as can possibly be obtained, and to make corrections for the slippage of the film by momentarily slowing down the speed of all of the sprockets carrying the film through the machine. This will momentarily change the speed of the pictures but due to the persistence of vision a person viewing the picture cannot detect this change.

The speed of the film through the picture portion of the projector can be changed as follows:

1. The provision of a clutch between the driving motor and all sprockets in the machine makes it possible to momentarily disengage the latter from the driving motor.

2. The provision of a motor drive for the sound portion of the machine, and a separate motor drive for the sprockets and the intermittent movement in the machine, makes it possible to slow down the latter drive by either—

(a) Momentarily interrupting the current supply to the latter motor;

(b) By phase displacement; e. g., throwing out of synchronism by D. C. on starter windings, etc.; or (c) By the momentary cessation of, or the speeding up of, the action of said last motor.

Another object of the invention is the provision in a projector of a film positively driven at a plurality of points and frictionally driven at at least one other point, and the provision of means for compensating said positive drive to correct for slippage in said friction drive.

A further object of the invention is the provision in a projector of feed and takeup sprockets and an intermittent movement, all adapted to positively move a film therethrough, the provision of a frictional drive engaging the film between the intermittent movement and one of said sprockets, loops being provided in the film on either side of said frictional drive, and the provision of means engaging the film in the vicinity of one of the loops and adapted to control the speed of the sprockets to maintain the picture carried by said sprockets in synchronism with sound reproduced from the film while under the influence of the frictional drive.

Still another object of the invention is the provision in a sound projector of means varying the number of pictures projected per second to compensate for slippage of the film through a sound reproducer in said projector without detection by an audience due to the persistence of vision.

Still a further object of the invention is the provision of a device through which film passes, the film being positively driven at a plurality of points and frictionally driven at another point, and the provision of means, associated with the means for positively driving the film, for making predetermined linear corrections in the speed of the film thereover at intermittent intervals to compensate for slippage of the film where it is frictionally driven, and to bring the film, where it is positively driven, into synchronism therewith.

Other objects of the invention will be apparent to those skilled in the art.

Referring to the drawings:

Figure 1 is a diagrammatic representation of a smooth drum for moving film through a sound reproducer and sprocket drives for feeding and projecting the film and delivering it to and from the drive; and Figure 2 is a diagrammatic representation of a sound picture projector showing one method of controlling a compensating device.

In the embodiment herein shown and described, a single motor drives both the sprocket and the sound drum. Loops are maintained on each side of the sound drum and, when one of these loops becomes shortened due to the slippage of the film passing over the drum, or due to changes in the lengths of these loops because of other linear errors in the movement of the film over the drum, it actuates a de-clutching device which disassociates the sprockets from the motor for several picture frames. For example, with the drum of a definite circumference, different thicknesses of film moving thereover will have various linear errors of movement which will cause one of the loops to become shortened and the other to become lengthened.

Referring to Figure 1, a motor 10 is provided with a reduction gear box 11 on one end thereof which includes a shaft 12 which is driven, at the rate of 144 revolutions a minute, for example. A shaft 13, mounted co-axially with respect to the shaft 12, is provided with a flanged member 14 having a plurality of studs 15 extending from the face thereof. The flanged member 14 is fixed or keyed into the shaft 13 in any suitable manner. A hub member 16 is keyed or otherwise fixed on the shaft 12 and carries a plurality of spring members 17 and 18. The spring members 17 bear against the studs 15, and the spring members 18 are each formed to partially embrace a stud 19, one stud 19 being provided adjacent to each stud 15. This arrangement of the flanged member 14, the hub member 16 and the sprockets and studs constitutes a combined flexible drive and mechanical filter.

A flywheel 22 is carried by the shaft 13 and forms a working fit therewith. This flywheel is not keyed to the shaft; it has a depression 23 formed therein and a friction member 24 frictionally engaging the bottom surface 25 of the depression 23. The friction member 24 is spring pressed against the surface 25 by a plurality of spring arms 26 which are secured to a flange member 27. This flange member is provided with a hub 28 which is keyed or pinned to the shaft 13 in any suitable manner, for example, by means of a taper pin 29.

The upper end of the shaft 13 has secured thereto a drum 30 which is provided with flanges 31 and 32. It is also provided with smooth surface 33 between the two flanges.

A crank arm 34, suitably pivoted in the frame 35, carries a roller 36 adapted to engage and hold a film in contact with the surface 33 of the drum. A spring 37 associated with the arm 34 and the frame 35, imparts a predetermined pressure on the roller which is in turn transferred to the drum along the line of contact of the roller with the film.

The other end of the motor 10 is provided with a reduction gear box 38 and has extended therefrom a shaft 39 which, in the embodiment shown, rotates at a speed of 360 revolutions per minute. The shaft 39 is supported by suitable journals 40 and 42 and has keyed or otherwise secured thereto a clutch member 41. The clutch member 41 has a notch 43 formed therein having a straight side and a slanting side terminating in a groove 44.

A clutch member 45, freely mounted on the shaft 39, is provided with a projection 46 having a straight side and a slanting side terminating in a tongue 47 which, when the clutch members are in engagement, forms a fit with the notch 43 with the tongue 47 resting in the groove 44.

The clutch member 45 is provided with a hub 48 having a groove 49 formed therein and has secured thereto a gear 50. A spring 51 is positioned on the shaft 39 between the journal 42 and the gear 50 tending to hold the clutch members 41 and 45 into engagement with each other. An arm 52 supported on a pivot shaft 53 is provided with a yoke 54 engaging the groove 49. The other end of the arm 52 is pivotally connected to a plunger 55 by means of a pivot pin 56.

The plunger 55 is operatively associated with a solenoid 57. When the winding of the solenoid is energized, the plunger is drawn into the solenoid thereby disengaging the projection 46 of the clutch member 45 from the notch 43 formed in the clutch member 41.

A shaft 58 has secured at one end thereof a gear 59 which meshes with the gear 50. The other end of the shaft 58 has associated therewith an intermittent movement positioned in a housing 60. This housing also contains the intermittent of a "Geneva" movement and has associated therewith a shaft 61 carrying an intermittent sprocket 62. A shaft 63 suitably journaled in the frame 35, has secured thereto a sprocket 64 which functions as a feed and takeup sprocket.

The shaft 58 and the shaft 63 are positively linked together in driving relation, a chain sprocket 65 being secured to the shaft 58 and a like chain sprocket 66 being secured to the shaft 63 and an endless chain 67 linking 65 and 66 together.

Referring to Figure 2, the film, designated by the numeral 68, passes from a reel (not shown) along the surface of the sprocket 64 and may be held into engagement with this sprocket by means of a roller 69 and may pass between free rollers 70 and 71. A loop 72 is formed in the film above the film gate 73. The film passes through the film gate to the intermittent film sprocket 62, a roller 74 being provided to retain the film in engagement with this sprocket.

Below the intermittent sprocket, a loop 75 is formed in the film after which it passes between free rollers 76 and 77 over the surface of a sound gate 78, over a roller 79 and on to the surface 33 of a drum 30.

The film is held into engagement with the drum by means of the roller 36 carried on the arm 34 above described, the spring 37 being of sufficient tension to hold the film frictionally against the surface 33 of the drum. This film is in contact with the surface 33 over the major portion of the surface of the drum, thereby holding slippage down to a minimum.

The film leaving the drum passes over the roller 36 and is formed into a loop 80 after which it passes between the free rollers 81 and 82 and is also engaged by some of the teeth in the sprocket 64. A roller 83 holds the film in contact with the lower surface of the sprocket 64.

The film, after leaving this sprocket, passes to a suitable takeup reel (not shown).

A bracket 84 supported on a suitable pivot pin 85 has secured thereto a mercury switch 86. The upper end of the bracket 84 carries a pivot shaft 87 which, in turn, has pivotally mounted thereon a roller 88.

One terminal 89 of the mercury switch 86 is connected via a wire 91 to one end of the solenoid 57. The other terminal 90 of the mercury switch is connected via the wire 92 to a source of current 93 which is in turn connected to the other end of the winding of the solenoid 57 by means of a wire 94.

The sound gate 78 has an aperture 95 formed therein and has positioned on one side thereof a light sensitive cell 96 which is connected to a suitable amplifier 97. A loud speaker 98 and its field coil 99 are connected to the amplifier.

An optical scanning unit 100 is positioned above the sound gate 78, as shown in Figure 2. A source of illumination 101 is provided for both the sound and the pictures. Light passes from this source 101, via a suitable condensing lens 102, through the film gate 73 and via an objective lens 103 to a screen 104.

A reflector 105 is positioned on the opposite side of the source to that of the condensing lens to reflect light therethrough. The optical scanning unit 100 receives its light endwise from the source 101, the latter being inverted for this purpose.

When the device is operating, the film 68 is positively moved by the sprocket 64 and the intermittent sprocket 62 to project a picture on the screen 104. As the film leaves the intermittent sprocket 62 it is frictionally driven by means of the drum 30, the loops 75 and 80 removing it from the mechanical influence of the sprocket.

As the drum 30 is driven at a constant speed, the sound is reproduced at a uniform rate. Due to the fact that the film is frictionally driven by the drum 30 slight increments of slippage occur which eventually shorten the loop 80.

As the loop 80 is shortened, the roller 88 is engaged and the bracket 84 is tilted, thereby tilting the mercury switch 86 and causing the mercury to connect the contacts 89 and 90 together. This action completes a circuit between the source of current 93 and the winding of the solenoid 57, resulting in the movement of the plunger 55 and through the medium of the arm 52, the clutch member 45 is disengaged from the member 41 for one revolution of the shaft 39.

Due to the fact that the shaft 39 is driven at the rate of 360 revolutions per minute, and due to the fact that the pictures are projected at the rate of 1440 a minute, the momentary disengagement of the sprocket mechanism from the driving mechanism will lengthen the loop four picture frames and permit the bracket 84 and the mercury switch 86 to assume their normal positions.

It is recognized that the picture may vary as much as four frames relative to the sound without perceptibly affecting the synchronism of the pictures with the sound.

In the embodiment of the invention above described, a mechanical member is shown engaging one of the loops for the purpose of effecting control, but I do not wish to limit my invention to this showing as it is obvious that control can also be effected by conductive, inductive, capacitive and/or electronic means cooperating with the film, preferably where it forms one of the loops.

In the embodiment shown and described, the drum is preferably of a diameter whose circumference is substantially equal to the length of ten picture frames, therefore, the drum is driven at the rate of 144 revolutions per minute, the speed of the film is equal to the length of 1440 picture frames.

Although a simple embodiment of the invention has been herein shown and described, it is obvious that many changes can be made in the arrangement shown without departing from the spirit of the invention as defined in the following claims.

What is claimed is:

1. In a device for projecting pictures and reproducing sound, a combined sound and picture record, a driving motor, a plurality of sprocket means for moving said film through said device to project said pictures, detachable means between said motor and said sprocket means, a scanning device including a sound gate for producing light modulations corresponding to said sound portion of the record, a non-positive driving member operatively connected to said motor for moving said film through said sound gate, means forming a loop in said film between said non-positive driving member and one of said sprocket means functioning as a takeup sprocket, means forming a loop in said film between said sound gate and another of said sprocket means, and means controlled by the length of said first loop for momentarily actuating said detachable means thereby momentarily interrupting the driving of all said sprocket means to bring the picture into synchronism with the portion of the sound record being scanned.

2. In a device for projecting pictures and reproducing sound, a combined sound and picture record, a film gate, a source of illumination on one side of said film gate, an objective lens on the other side of said gate, sprocket means for moving said film through said device including an intermittent movement associated with said film gate, a smooth drum engaging and driving said film during a portion of its transit through the device, a motor, means connecting said motor to said drum, means connecting said motor to said sprocket means, a scanning device including a sound gate positioned adjacent to said drum and adapted to scan the sound portion of said record, means forming a loop in said film between said drum and said sprocket means, means forming a loop in said film between said sound gate and said film gate, and means associated with said first loop for disassociating said sprocket means from said motor thereby retarding the projection of pictures to compensate for slippage of the film over said drum.

3. In a device for projecting pictures and reproducing sound, a combined sound and picture record, a film gate, a source of illumination on one side of said film gate, an objective lens on the other side of said gate, sprocket means for moving said film through said device including an intermittent movement associated with said film gate, a smooth drum engaging and driving said film during a portion of its transit through the device, a motor, means connecting said motor to said drum, means including a magnetically operated clutch connecting said motor to said sprocket means, a scanning device including a sound gate positioned adjacent to said drum and adapted to scan the sound portion of said record, means forming a loop in said film between said drum and said sprocket means, means forming a loop in said film between said sound gate and said film gate, a switch including a connection to a source of current and to the magnet of said clutch, and means adjacent to the first of said loops and adapted to be engaged by the latter when the film has slipped on said drum a predetermined length for actuating said switch and energizing said circuit thereby momentarily disconnecting said motor from said sprocket means, thereby maintaining said loop a predetermined general size.

4. In a device for projecting pictures and reproducing sound, a combined sound and picture record, a motor, sprocket means driven by said motor for moving said film through said device to project said pictures, a clutch between said motor and said sprocket means, a scanning device including a sound gate for producing light modulations corresponding to said sound portion of the record, a non-positive driving member driven by said motor for moving said film through said sound gate, a takeup sprocket, means forming a loop in said film between said non-positive driving member and said takeup sprocket, means forming a loop in said film between said sound gate and another of said sprocket means, a member associated with one of said loops and adapted to be engaged by the latter when said record slips over said non-positive driving member a predetermined amount, a switch controlled by the movement of said last member, mechanical means for disengaging said clutch, and a circuit including said switch said mechanical means and a source of current whereby said sprocket means may be disassociated with said motor when said record slips a predetermined amount.

5. A device of the character described, a picture projector and a sound reproducer for reproducing pictures and the accompanying sound from a combined sound and picture record, a motor, positive means for driving said record through said picture projector, a magnetic clutch between said motor and said positive means, a non-positive means for driving said record through said sound reproducer, a mechanical filter between said motor and said non-positive means, said positive means including a plurality of sprockets, a loop between an intermittent sprocket and said sound reproducer, a second loop between said sound reproducer and a takeup sprocket, switch means cooperating with said last loop and actuated when the record has slipped a predetermined amount, connections between a source of current, said clutch and said switch means for momentarily interrupting said positive driving means thereby bringing the picture into synchronism with the sound reproduced.

6. In a device for reproducing pictures and sound from a moving film record, a scanning device including a sound gate for scanning said record and a picture gate through which said pictures are projected, a motor, a non-positive driving means operatively connected to said motor and having a mechanical filter associated therewith for moving said film through said sound gate with a minimum of mechanical errors, positive driving means including a magnetically controlled clutch for feeding said film to and taking up said film from said non-positive driving means, said positive driving means including an intermittent motion associated with said picture gate, means forming a loop in said film record between said sound gate and said positive driving means for taking up said film, an electrical switch, an actuating member for said switch associated with said loop, and connections between said switch, the magnet of said clutch and the source of current forming a circuit adapted to be completed when said loop decreases in size, thereby disassociating said positive driving means from said motor.

WILLIAM J. MORRISSEY.